US007427029B2

(12) United States Patent
Bailleu et al.

(10) Patent No.: US 7,427,029 B2
(45) Date of Patent: Sep. 23, 2008

(54) VALUABLE DOCUMENT COMPRISING A SECURITY ELEMENT AND METHOD FOR PRODUCING SAID VALUABLE DOCUMENT

(75) Inventors: Anett Bailleu, Berlin (DE); Arnim Franz-Burgholz, Falkensee (DE); Hans Demanowski, Woltersdorf (DE); Daniel Grammlich, Karlsruhe (DE); Manfred Paeschke, Basdorf (DE); Konstantin Pötschke, Berlin (DE); Martin Sprenger, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 10/558,957

(22) PCT Filed: Mar. 31, 2004

(86) PCT No.: PCT/EP2004/003411

§ 371 (c)(1), (2), (4) Date: Jun. 19, 2006

(87) PCT Pub. No.: WO2004/108426

PCT Pub. Date: Dec. 16, 2004

(65) Prior Publication Data

US 2007/0199999 A1 Aug. 30, 2007

(30) Foreign Application Priority Data

Jun. 11, 2003 (DE) ................................ 103 26 644

(51) Int. Cl.
*G06K 19/00* (2006.01)

(52) U.S. Cl. ........................ 235/487; 235/491; 235/492

(58) Field of Classification Search ................. 235/487, 235/491, 492
See application file for complete search history.

(56) References Cited

U.S. PATENT DOCUMENTS

| | | | | |
|---|---|---|---|---|
| 5,726,531 | A | 3/1998 | Hirose et al. | |
| 6,144,156 | A * | 11/2000 | Lutschounig et al. | ........ 313/506 |
| 6,403,204 | B1 | 6/2002 | Kitai et al. | |
| 6,530,527 | B1 * | 3/2003 | Ahlers et al. | ................ 235/491 |

FOREIGN PATENT DOCUMENTS

| | | |
|---|---|---|
| DE | 40 24 602 | 2/1991 |
| DE | 42 18 289 | 12/1992 |
| DE | 43 10 082 | 9/1994 |
| DE | 197 08 543 | 9/1998 |
| DE | 198 02 269 | 10/1998 |
| DE | 39 32 505 | 3/2001 |
| DE | 697 03 295 | 5/2001 |

(Continued)

*Primary Examiner*—Steven S Paik
*Assistant Examiner*—Tuyen K Vo
(74) *Attorney, Agent, or Firm*—Darby & Darby

(57) ABSTRACT

A valuable document comprising at least one security element that is provided with a marking layer in a marking region, the layer containing an electroluminescent pigment and being applied to a carrier body. The electroluminescence of the pigment of one such valuable document must be able to be excited even with comparably low, externally applied field intensities. To this end, a plurality of electrically insulated field displacement elements having a minimum dielectric constant of 100 are distributed over the surface of the marking region, the field displacement elements being at a distance of approximately between 5 μm to 500 μm from each other and compressing the applied field in the gaps thereinbetween.

33 Claims, 2 Drawing Sheets

FOREIGN PATENT DOCUMENTS

| | | |
|---|---|---|
| EP | 0 680 411 | 11/1995 |
| EP | 1 003 646 | 5/2000 |
| WO | WO 98/47321 | 10/1998 |
| WO | WO 99/08881 | 2/1999 |

* cited by examiner

VALUABLE DOCUMENT COMPRISING A SECURITY ELEMENT AND METHOD FOR PRODUCING SAID VALUABLE DOCUMENT

BACKGROUND OF THE INVENTION

The invention relates to a valuable document comprising at least one security element which in a marking area comprises a marking layer that is applied to a carrier body and comprises electroluminescent pigments. It furthermore relates to a method for producing such a valuable document.

For protection against forgeries or copies, valuable documents or security documents such as bank notes, identity cards or chip cards, for example, are provided with so-called security features or security elements which are intended to reliably rule out inter alia the possibility of forgery by making color copies, for example in the case of valuable documents in paper form. The security elements may in this case be designed in particular as optically variable elements, such as holograms or interference layer elements for example, which, when viewed, give different color impressions depending on the viewing angle, but are not transferred to the copy during the copying process. The optically variable elements may in this case also be applied in the form of pigments, so-called OVI pigments, which in particular allows processing by means of printing technology. However, such security elements cannot or can only with difficulty be read or evaluated by machine, so that automated security checking of the respective valuable documents is possible only to a limited extent and with a high level of technical complexity.

However, DE 197 08 543 discloses a valuable document which in particular is also suitable for automated evaluation of its security elements. To this end, the valuable document comprises, as the security element, in a marking area, a marking layer with added electroluminescent pigments which is applied to a carrier body, for example the banknote paper. When this security element is checked or authenticated, the marking layer comprising the electroluminescent pigments is exposed to an alternating electric field via a suitably designed test device, in a contactless manner. The alternating electric field excites the electroluminescent pigments contained in the marking layer to bring them to the point of luminescence, and this can be recorded directly or indirectly in a suitable receiver. Particularly in combination with the corresponding test device, this type of valuable document is thus particularly suitable for automated and thus particularly reliable evaluation with only limited technical complexity.

However, it has been found that relatively high electric fields are necessary for reliable excitation of the electroluminescent pigments in such a valuable document. Depending on the integration of the electroluminescent pigments in the surrounding matrix, it is even conceivable that the field strengths required for excitation lie above the breakdown field strengths of the matrix, so that excitation cannot take place or can take place only under much more difficult conditions. The use of electroluminescent pigments (favorable on account of their ability for automated evaluation) in a security element of a valuable document is thus possible only to a limited extent.

The object of the invention is to provide a valuable document of the type mentioned above which allows the use of electroluminescent pigments in the security element for a particularly large number of use and environmental conditions. Moreover, a method which is particularly suitable for producing such a valuable document is also provided.

SUMMARY OF THE INVENTION

The object is achieved according to the invention by providing a valuable document wherein a plurality of electrically insulated field displacement elements having a dielectric constant of more than approximately 50, preferably of more than approximately 200, are arranged in the marking area in a manner distributed over the surface, said field displacement elements being at an average distance from one another of approximately 5 μm to 500 μm, in one particularly advantageous embodiment of approximately 10 μm to 200 μm.

The invention is based on the consideration that, for a particularly wide range of use possibilities for the electroluminescent pigments, that is to say in particular for a large number of combination possibilities using a wide range of carrier materials or surrounding materials, the electric field strength which is required for excitation of the electroluminescence of the pigments and which is to be applied macroscopically should be kept particularly low. In particular, the field strength required for excitation should be kept below typical breakdown field strengths of the materials to be used in air or of the matrix. In order on the one hand to provide an electric field strength which is high enough for excitation of the electroluminescent pigments locally, that is to say in the direct vicinity of said pigments, whereas on the other hand the electric field strength which is to be applied macroscopically is to be kept relatively low, targeted focusing of the macroscopically applied electric field strength is provided, in the sense of a local field increase at the at the electroluminescent pigments. In order to make this possible, field displacement elements which are in each case electrically insulated from their surroundings are provided in the region of the marking layer, which field displacement elements increase the applied electric field as a result of their dielectric constant which is selected to be suitably high, and on account of the field displacement brought about thereby, particularly in the longitudinal direction thereof in the regions of their intermediate spaces. As a result of this local field increase, the field strengths required for excitation of the electroluminescence are achieved locally in said intermediate spaces even in the event of relatively low macroscopically applied field strengths, wherein the field displacement elements are suitably dimensioned for the desired strengthening effect, in particular with regard to the lateral size of the intermediate spaces left between said elements.

A particularly advantageous strengthening effect of the electric field in the local vicinity of the electroluminescent pigments can be achieved by advantageously also suitably dimensioning the field displacement elements with regard to their average size, and in particular by adapting them to the typical particle sizes of the electroluminescent pigments. To this end, the field displacement elements advantageously have a lateral size of up to approximately 500 μm.

In order to ensure the desired field displacement, the field displacement elements may be formed of dielectric material having a dielectric constant which is selected to be suitably high. However, particularly effective field compression in the intermediate spaces left between said elements can be achieved by forming the field displacement elements of electrically conductive material, so that they form electrodes which are in each case electrically insulated from their surroundings, these being referred to as "floating" electrodes.

In order to influence and focus the electric field in a targeted manner and in a way which can be adapted to the pigments used, the field displacement elements are advantageously applied to the carrier body by means of printing technology, that is to say for example using a conventional printing process, such as intaglio printing technology or screen printing technology for example. Even in the case of a relatively statistical distribution of the electroluminescent pigments in the marking layer, a strengthening effect which is particularly uniform over the surface can be achieved, in another advantageous embodiment, by applying the field displacement elements to the carrier body in the form of a laterally regular structure, preferably in the manner of a point lattice or grid, in the manner of a periodic line structure or in the manner of an open cross lattice. In the case of such field displacement elements which are applied by means of printing technology, their lateral size is advantageously approximately 10 μm to 500 μm, in one particularly advantageous embodiment approximately 50 μm to 200 μm.

In one particularly advantageous embodiment, further security elements of the valuable document which are provided in any case may be used additionally as electrodes for the intended local field strengthening. By way of example, a metal security strip and/or a hologram applied to the carrier body may be provided as such a further security feature which thus serves a dual function as an actual security feature and also as an electrode for the field strengthening during excitation of the electroluminescent pigments, wherein, in order to be used as an electrode for the electric field strengthening, suitable positioning in the vicinity of the marking layer comprising the electroluminescent pigments should be provided. This is because, if the electroluminescent evaluation area lies directly below the hologram or the foil element, the respective conductive structure should be interrupted in any case, so as to prevent screening of the electroluminescent pigments. The desired field increase occurs at these points of interruption. As an alternative or in addition, advantageously at least some of the electrodes are integrated in the marking layer per se, so that particularly good field strengthening can be obtained on account of the direct spatial proximity to the electroluminescent pigments. Here, security fibers for example may be incorporated in the marking layer as field displacement elements with a high dielectric constant.

One particularly simple possibility for producing such a valuable document with particularly flexible variation possibilities for adapting the emission properties of the pigments can be achieved, in one particularly advantageous embodiment, by incorporating the field displacement elements, or at least some of them, in the marking layer in the form of pigments, preferably electrically conductive pigments, with a dielectric constant of more than approximately 50, in addition to the electroluminescent pigments. It is possible here, particularly during application of the marking layer, given a suitable choice of starting product, particularly in the case of intimate mixing of the electroluminescent pigments with the pigments having a high dielectric constant in the starting material, to apply both the particles which are actually active in the security elements, that is to say the electroluminescent pigments, and the field-strengthening particles, that is to say the pigments with a high dielectric constant, in just a single operation and thus with particularly low complexity.

Particularly with regard to the necessary production complexity and the variation possibilities in the case of a graphic configuration of the marking layer, for example to display optical information, particular preference is given to the use of a printing process, preferably screen printing, intaglio printing, offset printing or letterset printing, for application of the marking layer to the carrier body. The marking layer is particularly suitable for being produced by means of printing processes since its essential components, that is to say in particular the electroluminescent pigments and/or the electrically conductive pigments, are designed to be particularly suitable for application in a printing process. To this end, the electrically conductive pigments advantageously have an average pigment size of less than 25 μm. A particularly pronounced field strengthening effect can furthermore be achieved if, in one particularly advantageous embodiment, the electrically conductive pigments have a pigment size of approximately 3 μm to 7 μm.

With regard to the desired field strengthening effect, the pigments of high dielectric constant are moreover suitably selected in terms of their total content of the intended particles. As has been found, a suitable parameter for this is the surface coverage, with which the respective particles lie next to one another on the substrate, and this can be determined for example in relation to the marking layer. In order on the one hand to obtain a sufficiently high field strengthening effect but on the other hand to avoid screening the electroluminescent particles lying therebetween, or even electric flashovers, the pigments of high dielectric constant are advantageously applied with a surface coverage of somewhat less than 50%, preferably somewhat less than 40%. In the case of electrically conductive pigments provided as electrodes, these pigments preferably exhibit a surface coverage of somewhat less than 30%.

As has moreover surprisingly been found, a particularly high field strengthening effect can be achieved if the pigments of high dielectric constant have a spatially anisotropic shape, preferably approximately a needle shape or a platelet shape.

For a particularly pronounced electroluminescence behavior when seen above the marking layer, on the one hand a particularly pronounced field compression should be ensured by means of a sufficient content of field-strengthening pigments, but on the other hand the formation of electric short-circuits within the marking layer on account of too high a content of such pigments should be avoided. Furthermore, an electroluminescence which is high overall should be ensured by providing a sufficiently high content of electroluminescent pigments, but on the other hand it has been found that, in the case of too high a content of electroluminescent pigments, only a relatively low fraction thereof are actually excited to the point of electroluminescence. Taking account of these facts, it has proven to be particularly advantageous if, in the marking layer, the ratio of the content of electroluminescent pigments to the content of pigments of high dielectric constant is approximately 6:1 to 1:6, preferably approximately 2:1 to 1:2.

As particularly suitable strengthening materials, metal pigments, preferably Fe, Cu, Al or Ag pigments or pigments of conductive polymers, preferably of polyaniline, are advantageously provided as pigments of high dielectric constant. Specifically, the use of silver (Ag) pigments is particularly advantageous here since the addition of silver particles leads to a blackening effect when the respective optical structure is copied, so that such particles can also serve as an additional security feature. As an alternative or in addition, pigments of highly doped semiconductor materials, carbon fibers or barium titanate may also be added. Barium titanate having a dielectric constant of preferably approximately 1000 to 1000 is particularly suitable here for forming the field displacement elements.

In a further or alternative advantageous embodiment, pigments consisting of base bodies which are at least partially coated with metal are also provided as pigments of high dielectric constant. The base bodies, which for their part may be produced on the basis of plastic, for example of PVC or PC, or on the basis of the actual electroluminescent pigments, may in this case, as starting product, be completely covered with metal compounds by means of so-called microencapsulation or coating processes, wherein electrochemical reduction processes, the growing of layers or sputtering may also be provided as alternatives for applying the metal compounds. The base bodies, in particular the electroluminescent pigments, are in this case provided in particular with a layer having a thickness in the nm or μm range. These starting products can be mechanically split for example by means of a grinding process in a ball mill, and can thus be broken open, wherein fragments are produced which have only partially electrically conductive boundaries.

With respect to the method for producing the valuable document, the abovementioned object is achieved in that the marking layer is applied to the carrier body by means of a printing process, preferably by means of screen printing, intaglio printing, offset printing, letterpress printing or letterset printing. This permits relatively simple production of the valuable document equipped with the security element, wherein a particularly high degree of flexibility is moreover made possible for any desired graphic configuration of the marking layer, for example as a printed image.

A particularly advantageous adaptability of the electrode structures to the requirements of field compression can be achieved if the field displacement elements are advantageously printed onto the carrier body before or after the application of the marking layer, wherein in particular the lateral structure of the field displacement elements can be adapted to material-specific requirements. During the printing operation, regular lateral structures, such as point lattices or grids, periodic line structures or open cross lattices, for example, may be produced. The application of the material intended to form the field displacement elements may be carried out for example by the printing-on of suitably selected conductive printing inks.

However, a particularly simple and thus particularly preferred production process can be achieved if the electroluminescent pigments of the marking layer are applied to the carrier body in one operation together with the field displacement elements provided for field strengthening. To this end, during application of the marking layer, use is advantageously made of a printing ink which contains pigments with a dielectric constant of more than approximately 50, preferably electrically conductive pigments, in addition to the electroluminescent pigments and any solvent and/or binder which may be necessary, in order to form the field displacement elements.

Advantageously, the printing ink is designed in terms of its composition and in terms of its constituents for particularly good usability in a printing process. To this end, the printing ink advantageously comprises a total pigment content, that is to say with regard to the electroluminescent pigments and the pigments of high dielectric constant, of less than 30%, preferably less than 25%. Furthermore, the pigments are advantageously designed in such a way that they are particularly suitable for use in a printing process. To this end, the electroluminescent pigments and/or the electrically conductive pigments advantageously have an average particle size of less than 25 μm.

The printing ink can be produced for example by adding electroluminescent pigments and electrically conductive strengthening pigments to solvents and/or binders, optionally with the addition of further inks, and then mixing. During the production, particular care should advantageously be taken to ensure that, in the desired end product, that is to say in the marking layer applied to the carrier body, particularly advantageous concentrations of the individual particle fraction are produced, that is to say on the one hand of the electroluminescent pigments and on the other hand of the pigments provided for field strengthening, with regard to a particularly pronounced overall electroluminescence. In view of this aim, use is advantageously made of a printing ink which comprises a content by weight of approximately 3% to 20%, preferably of approximately 5% to 10%, of electroluminescent pigments and/or a content by weight of approximately 1% to 20%, preferably of approximately 3% to 15%, of pigments of high dielectric constant. In an additional or alternative advantageous embodiment, in the printing ink, the ratio of the content of electroluminescent pigments to the content of pigments of high dielectric constant is approximately 6:1 to 1:6, preferably approximately 2:1 to 1:2.

The advantages achieved by the invention consist in particular in the fact that, by virtue of the targeted combination of electroluminescent pigments with suitably positioned and dimensioned field displacement elements, in particular electrically insulated ("floating") electrodes, in the region of the marking layer, a targeted compression and focusing of an electric field applied from outside in a contactless manner can be achieved in the direct vicinity of the electroluminescent pigments. As a result, the field strength required for excitation of electroluminescence can be reliably achieved in the local vicinity of the electroluminescent pigments even in the event of relatively moderate or low externally predefined electric field strengths, so that excitation of the luminescence is possible with relatively low external fields. As a result, relatively flexible use of the electroluminescent pigments is ensured. One particular simple mode of production can be achieved if the electroluminescent pigments on the one hand and the pigments provided as strengthening particles on the other hand are applied to the carrier body in each case by means of printing technology, with just a single operating step being necessary for this purpose on account of providing the field displacement elements in the form of suitably selected pigments in the actual printing ink together with the electroluminescent pigments.

BRIEF DESCRIPTION OF THE DRAWINGS

One example of embodiment of the invention is explained in more detail with reference to a drawing, in which.

Identical parts bear the same references in all the figures.

DETAILED DESCRIPTION

Figure 1:
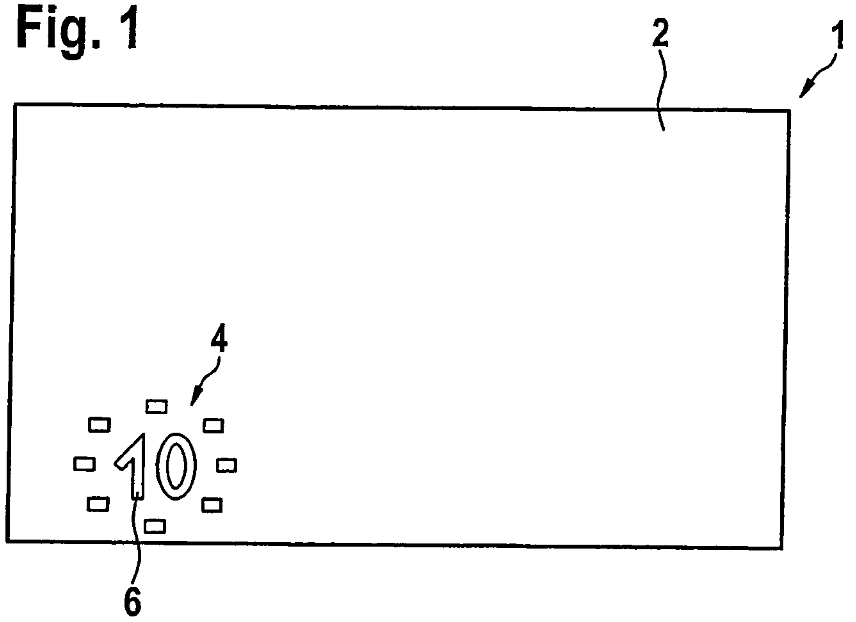
FIG. 1 shows a valuable document in plan view.

The valuable document 1 shown in FIG. 1, which may for example be a bank note, an identity card, a chip card or any other security document protected against forgery or copying, comprises as the base element a carrier body 2 which, depending on the intended use of the valuable document 1, may be made of paper, of plastic, of laminated plastic layers or of some other suitably selected material. A security element 6 is applied to the carrier body 2 in a marking area 4. The security element 6 and the marking area 4 covered by said element may be dimensioned and configured according to any given criteria tailored to the intended use, and in particular may be provided for optically displaying a printed image, for example a numerical value.

The security element 6 is particularly configured for automated evaluation of its security function. To this end, as shown in cross section in the examples of embodiments of FIGS. 2 and 7, the security element 6 comprises in the marking area 4 a marking layer 8 which is applied to the carrier body 2. The marking layer 8 is in this case formed on the basis of electroluminescent pigments 10 so as to ensure the ability for automated evaluation. In order to authenticate or evaluate the security element 6, electric radiation is irradiated into the marking layer 8 in a contactless manner by a suitably selected test device, as disclosed for example in DE 197 08 543. The electric field introduced into the marking layer 8 triggers electroluminescence phenomena in the pigments 10 via the locally produced alternating electric field, with it being possible for the electromagnetic response radiation which is generated to be detected by a suitable sensor and evaluated in an automated manner.

The security element 6 is in this case designed in particular to reliably ensure the excitation of the electroluminescence of the pigments 10 which is intended for authentication purposes, even when the electromagnetic radiation is introduced only with a relatively low field strength. To this end, the security element 6 is intended for compression of the irradiated electric field in particular in the longitudinal direction thereof, which is preferably oriented essentially laterally with respect to the carrier body 2 as shown by the arrow 12, in the vicinity of at least some of the electroluminescent pigments 10. For such a field concentration, the security element 6 is equipped with electrically insulated (that is to say electrically connected neither to one another nor to an external conductor) and suitably dimensioned field displacement elements 14. To this end, the field displacement elements 14 have a high dielectric constant of more than 100, with electrically conductive materials being selected in the example of embodiment to form electrodes. In the example of embodiment, the electrodes thus exist as so-called "floating" electrodes. The field displacement elements 14 are in this case restricted to a characteristic size of up to approximately 0.1 mm, particularly in their lateral dimension, that is to say seen in the direction parallel to the surface of the carrier body 2. In addition to the field displacement elements designed as "floating" electrodes, further electrodes which are connected to external elements may be provided in the region of the marking layer 8.

Figure 2:
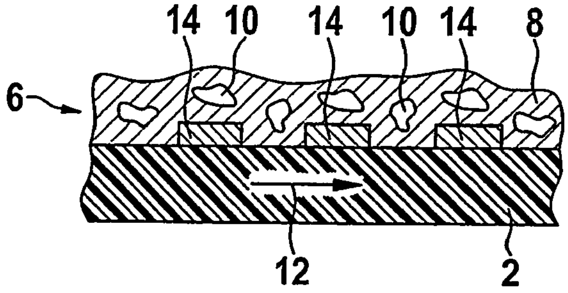
FIG. 2 shows a detail of the marking area of the valuable document of FIG. 1, in cross section.

In the example of embodiment shown in FIG. 2, the electrodes are made of a suitably selected, electrically conductive material which has been applied to the carrier body 2 by means of a printing process, preferably by means of a screen printing process. The starting material provided for forming the electrodes is in this case provided in particular in the form of a suitably selected, conductive printing ink. In the production of the valuable document 1 in the example of embodiment shown in FIG. 2, once the electrodes have been printed on, the marking layer 8 comprising the electroluminescent pigments 10 is applied, but alternatively the electrodes could also be printed onto the marking layer 8.

In terms of their shape and dimensioning, the electrodes in the example of embodiment shown in FIG. 2 are particularly adapted to the intended effect of field compression and strengthening in the vicinity of the pigments 10. To this end, the electrodes are applied to the carrier body in the form of a periodic lateral structure, so that a satisfactory focusing effect of the electric field is achieved even in the case of a statistical distribution of the pigments 10 on the carrier body 2.

Examples of embodiments for electrode structures are shown in FIGS. 3 to 6.

Figure 3:
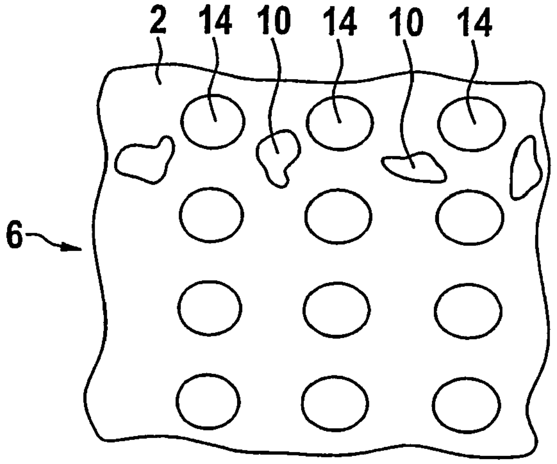
FIG. 3 shows the detail of FIG. 2 in plan view, FIGS. 4-6 in each case schematically show an electrode structure.
Figure 4:
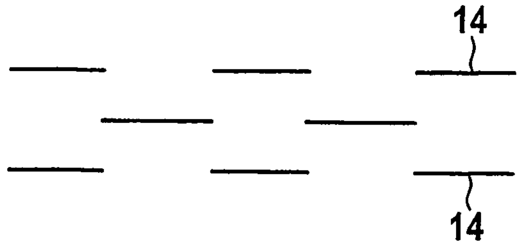
Figure 5:
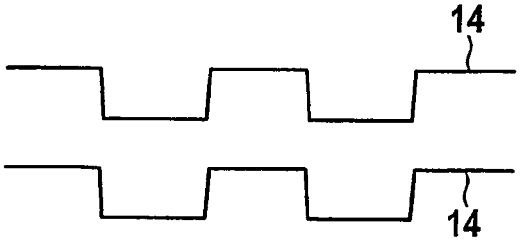
Figure 6:
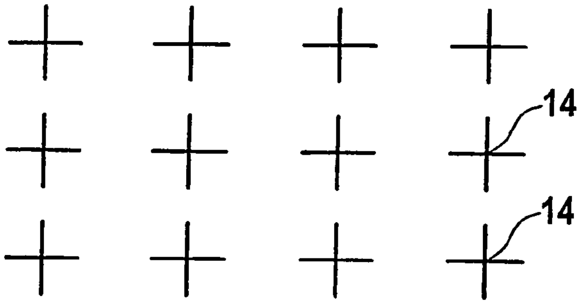

FIG. 3 shows in plan view a detail of the security element 6 in the marking area 4. In the example of embodiment shown in FIG. 3, the electrodes are applied in the form of a regular point lattice. For the sake of clarity, only a few of the electroluminescent pigments 10 are shown in FIG. 3. For a particularly advantageous field strengthening effect, as can be seen in FIG. 3, the electrodes are adapted both in terms of their lateral dimensioning and in terms of their respective distance from one another to the average size of the electroluminescent pigments 10. In this case, a size of approximately 25 μm is preferably selected for the lateral dimension of the electrodes, with the electrodes being arranged at an average distance of approximately 10 μm to 50 μm from one another. Alternatives for the lateral structure of the electrodes are shown schematically in FIGS. 4 to 6. In the example of embodiment shown in FIG. 4, the electrodes are applied in the form of interrupted straight lines. As an alternative, a line pattern as shown in FIG. 5 may be provided. In the example of embodiment shown in FIG. 6, on the other hand, an open cross lattice is provided for the structure of the electrodes.

Figure 7:
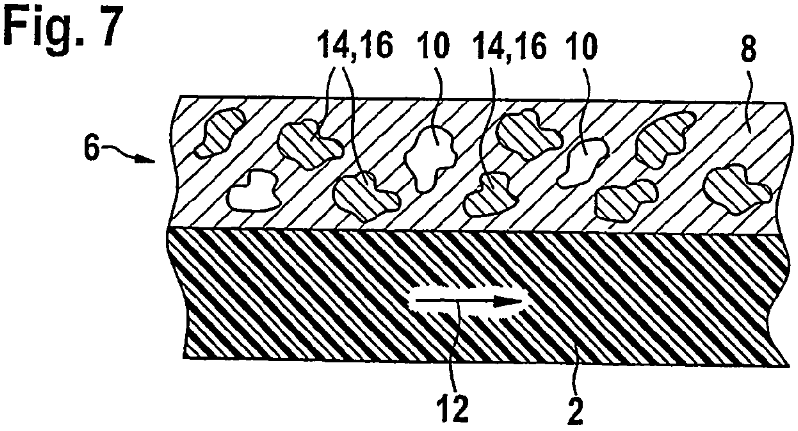
FIG. 7 shows a further example of embodiment of a detail of the valuable document of FIG. 1 in its marking area, in cross section.

In the particularly preferred embodiment shown in FIG. 7, however, the application both of the electroluminescent pigments 10 and of the field displacement elements 14 is provided in just a single operation. To this end, the field displacement elements 14 in this embodiment are integrated in the actual marking layer 8 in the form of pigments 16 having a dielectric constant of more than 100, in the example of embodiment electrically conductive pigments 16. The electrically conductive pigments 16 which are provided for forming the electrodes are in this case particularly adapted in terms of their shape and dimensioning to the desired local field strengthening of the irradiated electric field.

To this end, the electrically conductive pigments 16 have a spatially anisotropic shape which could in particular assume a needle shape. In terms of their particle size or pigment size, an average size of approximately 3 μm to 7 μm is provided. In the example of embodiment, the mixing ratio between electroluminescent pigments and electrically conductive pigments 16 is also particularly adapted to the desired field strengthening so as to facilitate the excitation of the electroluminescence. To this end, in the example of embodiment shown in FIG. 7, approximately the same amount of electrically conductive pigments 16 as electroluminescent pigments 10 is contained in the marking layer 8. In the marking layer 8, the ratio of surface coverage of the electroluminescent pigments 10 to the content of electrically conductive pigments 16 is thus approximately 2:1 to 1:2. Moreover, further additives, such as barium titanate ($BaTiO_3$) for example, may be provided in the marking layer 8.

The electrically conductive pigments 16 could in principle be formed of any material with a suitably high conductivity, for example conductive polymers, such as polyaniline, metal-coated plastics based on PVC or PC, highly doped semiconductor materials or carbon fibers. In the example of embodiment, however, the pigments 16 are designed as metal pigments, in particular as aluminum or copper particles. When use is made of shiny silver particles as electrically conductive pigments 16, an additional effect can be achieved since these particles would cause blackening of the copy image if an attempt were made to copy the document and thus can serve as an additional security element.

During production of the valuable document 1 in the form shown in FIG. 7, the marking layer 8 is applied to the carrier body 2 by means of a printing process, in particular by means of screen printing, intaglio printing, offset printing or letterset printing. For application of the marking layer 8, use is made of a printing ink in which the electrically conductive pigments 16 are contained in addition to the electroluminescent pigments 10 and a solvent and/or binder. For particularly good usability in the printing ink, the electroluminescent pigments 10 and/or the electrically conductive pigments 16 are in this case designed for an average particle size of less than 25 μm.

In the printing ink, the ratio of the content of electroluminescent pigments 10 to the content of electrically conductive pigments 16 is approximately 2:1 to 1:2, depending on the desired distribution of surface coverage in the marking layer 8 as shown in FIG. 7. The printing ink used in the production of the marking layer 8 moreover comprises a content by weight of approximately 5% to 10% of electroluminescent pigments 10 and a content by weight of approximately 5% to 15% of electrically conductive pigments 16. Further pigments of the printing ink, for example particles in the binder of the ink, preferably likewise have a particle size of less than approximately 3 μm.

Additionally, further security features which are provided in any case, such as security strips or holograms for example, may be used as further electrodes 14.

The invention claimed is:

1. A valuable document comprising:

a carrier body having a marking area and at least one security element located in the marking area, the security element comprises a marking layer that is applied to the carrier body, the marking layer comprises electroluminescent pigments and a plurality of field displacement elements having a dielectric constant of more than 50 and each being electrically insulated from its surroundings and arranged at an average distance from one another of approximately 5 μm to 500 μm in the marking area so as to provide intermediate spaces therebetween, wherein at least some of the electroluminescent pigments are disposed in the intermediate spaces, and wherein the field displacement elements are configured to increase a macroscopically applied electrical field strength locally in the intermediate spaces.

2. The valuable document as claimed in claim 1, wherein the dielectric constant is more than 200 and the average distance is between 10 μm to 200 μm.

3. The valuable document as claimed in claim 1, wherein the field displacement elements have a lateral size of up to approximately 0.5 mm.

4. The valuable document as claimed in claim 1, wherein the field displacement elements comprise electrically conductive electrodes.

5. The valuable document as claimed in claim 1, wherein the field displacement elements are printed elements on the carrier body.

6. The valuable document as claimed in claim 5, wherein the printed field displacement elements comprise a laterally regular structure comprising one of a point lattice, a grid, a periodic line structure, and an open cross lattice.

7. The valuable document as claimed in claim 1, including a further security feature comprising a metal security strip and/or a hologram, is provided as at least one of the field displacement elements on the carrier body.

8. The valuable document as claimed in claim 1, wherein at least one of the field displacement elements is integrated in the marking layer.

9. The valuable document as claimed in claim 1, wherein at least one of the field displacement elements are integrated in the carrier body.

10. The valuable document as claimed in claim 1, wherein the field displacement elements comprise electrically conductive pigments having a dielectric constant of more than 50 and electroluminescent pigments incorporated in the marking layer.

11. The valuable document as claimed in claim 10, wherein the electrically conductive pigments cover a surface coverage of less than 50%.

12. The valuable document as claimed in claim 10, wherein the electrically conductive pigments cover a surface coverage of less than 40%.

13. The valuable document as claimed in claim 10, wherein the electrically conductive pigments a surface coverage of less than 30%.

14. The valuable document as claimed in claim 10, wherein the electrically conductive pigments have a spatially anisotropic shape.

15. The valuable document as claimed in claim 14, wherein the shape is a needle shape or a platelet shape.

16. The valuable document as claimed in claim 10, wherein the ratio of surface coverage of the electrically conductive pigments is approximately 6:1 to 1:6.

17. The valuable document as claimed in claim 10, wherein the ratio of surface coverage of the electrically conductive pigments is approximately 2:1 to 1:2.

18. The valuable document as claimed in claim 10, wherein the electrically conductive pigments comprise metal pigments selected from the group consisting of Fe, Cu, Al, Ag and mixtures thereof.

19. The valuable document as claimed in claim 10, wherein the electrically conductive pigments comprise polymers preferably of polyaniline, are provided as pigments of high dielectric constant.

20. The valuable document as claimed in claim 19, wherein the polymer is polyaniline.

21. The valuable document as claimed in claim 10, wherein the electrically conductive pigments comprise base bodies which are at least partially coated with metal.

22. A method for producing a valuable document as claimed in claim 1, including applying the marking layer to the carrier body by means of a printing process selected from the group consisting of screen printing, intaglio printing, offset printing, and letterset printing.

23. The method as claimed in claim 22, including printing the displacement elements onto the carrier body.

24. The method as claimed in claim 22, wherein the field displacement elements comprise a printing ink which contains pigments with a dielectric constant of more than 50, electroluminescent pigments, and a solvent and/or binder.

25. The method as claimed in claim 24, wherein the printing ink comprises a total pigment content of less than 30%.

26. The method as claimed in claim 24, wherein the printing ink comprises a total pigment content of less than 25%.

27. The method as claimed in claim 25, wherein the printing ink comprises a content by weight of approximately 1% to 20% of electroluminescent pigments.

28. The method as claimed in claim 25, wherein the printing ink comprises a content by weight of approximately 5% to 10% of electroluminescent pigments.

29. The method as claimed in claim 27, wherein the printing ink comprises a content by weight of approximately 1% to 20% pigments of high dielectric constant.

30. The method as claimed in claim 27, wherein the printing ink comprises a content by weight of approximately 3% to 15% pigments of high dielectric constant.

31. The method as claimed in claim 29, wherein the printing ink has a ratio of electroluminescent pigments to pigments of high dielectric constant of 6:1 to 1:6.

32. The method as claimed in claim 29, wherein the printing ink has a ratio of electroluminescent pigments to pigments of high dielectric constant of 2:1 to 1:2.

33. The method as claimed in claim 31, wherein the electroluminescent pigments and/or the pigments of high dielectric constant have an average particle size of less than 50 μm.

* * * * *